(12) United States Patent
Graff et al.

(10) Patent No.: US 9,155,990 B2
(45) Date of Patent: Oct. 13, 2015

(54) METHOD AND PLANT FOR AMINE EMISSION CONTROL

(75) Inventors: Oscar Fredrik Graff, Hosle (NO); Otto Morten Bade, Stabekk (NO); Oddvar Gorset, Roa (NO); Simon Woodhouse, Strømmen (NO)

(73) Assignee: Aker Clean Carbon AS, Oslo (NO)

( * ) Notice: Subject to any disclaimer, the term of this patent is extended or adjusted under 35 U.S.C. 154(b) by 920 days.

(21) Appl. No.: 13/148,495

(22) PCT Filed: Feb. 12, 2010

(86) PCT No.: PCT/EP2010/051775
§ 371 (c)(1),
(2), (4) Date: Aug. 9, 2011

(87) PCT Pub. No.: WO2010/102877
PCT Pub. Date: Sep. 16, 2010

(65) Prior Publication Data
US 2011/0308389 A1 Dec. 22, 2011

(30) Foreign Application Priority Data
Mar. 13, 2009 (NO) .................................. 20091103

(51) Int. Cl.
*B01D 53/14* (2006.01)
*B01D 53/62* (2006.01)

(52) U.S. Cl.
CPC ........ *B01D 53/1475* (2013.01); *B01D 53/1406* (2013.01); *B01D 53/62* (2013.01); *B01D 2251/504* (2013.01); *B01D 2251/506* (2013.01);
(Continued)

(58) Field of Classification Search
CPC ................... B01D 2251/504; B01D 2251/506; B01D 2251/512; B01D 53/1406; B01D 53/1475
See application file for complete search history.

(56) References Cited

U.S. PATENT DOCUMENTS

| 2,608,461 A | 8/1952 | Frazier |
| 3,923,955 A | 12/1975 | Fattinger |

(Continued)

FOREIGN PATENT DOCUMENTS

| EP | 0798029 A2 | 10/1997 |
| JP | H04161225 A | 6/1992 |

(Continued)

OTHER PUBLICATIONS

Persichini, Carlo, "International Search Report", for PCT/EP2010/051775, as mailed May 3, 2010, 3 pages.

*Primary Examiner* — Duane Smith
*Assistant Examiner* — Cabrena Holecek
(74) *Attorney, Agent, or Firm* — Winstead PC

(57) ABSTRACT

A method for eliminating or substantially reducing emission of amines (amineslip) and alkaline degradation products to the atmosphere from a plant for $CO_2$ capture from a flue gas, where the $CO_2$ is captured by counter-current flow to an absorbent in an absorption zone, the absorbent comprising an aqueous solution of one or more amine(s), to give a $CO_2$ lean flue gas that is released into the surroundings, and a $CO_2$ rich absorbent that is regenerated in a regeneration column to give a $CO_2$ rich gas that is treated further, and regenerated absorbent that is recycled to the absorption zone, wherein the $CO_2$ lean flue gas is washed with an acidic aqueous solution to remove or substantially reduce the amount of amine(s) and alkaline degradation products thereof in the gas, is described.

18 Claims, 4 Drawing Sheets

(52) U.S. Cl.
CPC .......... *B01D 2251/512* (2013.01); *Y02C 10/06* (2013.01)

(56) References Cited

U.S. PATENT DOCUMENTS

| | | | |
|---|---|---|---|
| 4,112,051 A | 9/1978 | Sartori et al. | |
| 4,397,660 A | 8/1983 | Van der Pas-Toornstra | |
| 4,942,734 A | 7/1990 | Markbreiter et al. | |
| 5,061,465 A | 10/1991 | Carter | |
| 5,378,442 A * | 1/1995 | Fujii et al. | 423/228 |
| 5,528,811 A | 6/1996 | Abidin et al. | |
| 2002/0081256 A1 | 6/2002 | Chakravarti et al. | |
| 2003/0045756 A1 | 3/2003 | Mimura et al. | |
| 2004/0265199 A1 * | 12/2004 | MacKnight | 423/220 |
| 2008/0159937 A1 | 7/2008 | Ouimet | |

FOREIGN PATENT DOCUMENTS

| | | |
|---|---|---|
| JP | H05146625 A | 6/1993 |
| JP | H05245340 A | 9/1993 |
| JP | H1033938 A | 2/1998 |

* cited by examiner

METHOD AND PLANT FOR AMINE EMISSION CONTROL

TECHNICAL FIELD

This application is a U.S. National Stage entry under 35 U.S.C. 371 of International Application PCT/EP10/51775 filed Feb. 12, 2010, which claims foreign priority benefit to Norwegian Application No. 2009 1103 filed Mar. 13, 2009. The present invention relates to the field of $CO_2$ capture and sequestration. More specifically the present invention relates to an improved method and an improved absorber for reducing the problem related to emissions from amine based $CO_2$ capture plants, which are released into the surroundings by the $CO_2$ depleted exhaust gas being discharged to air.

BACKGROUND

The continually increasing combustion of fossil fuel, such as coal, natural gas and oil, during the last centuries has resulted in an increase in the concentration of $CO_2$ in the atmosphere. The increasing concentration of $CO_2$ has caused concern due to the greenhouse effect caused by $CO_2$. The greenhouse effect is suspected already to have caused at least some of the changes in the climate that have been seen during the last decades, and is according to simulation models suspected to cause even more and potentially dramatic changes in the climate of planet earth.

This has caused a call for action from scientists, environmentalists and politicians throughout the world, to stabilize or even reduce the discharge of $CO_2$ from combustion of fossil fuel into the atmosphere. A stabilization or even reduction of the discharge of $CO_2$ into the atmosphere from combustion of fossil fuel may be achieved by capturing and safe depositing of $CO_2$ from the exhaust gas from thermal power plants and other plants where fossil fuel is combusted.

The captured $CO_2$ may be injected in sub terrain formations such as aquifers, oil wells for enhanced oil recovery or in depleted oil and gas wells for deposition. Tests indicate that $CO_2$ remains in the sub terrain formation for thousands of years and is not released into the atmosphere.

Capturing of $CO_2$ from a gas by means of absorption is well known and has been used for decades, e.g. for removal of $CO_2$ (and other acid gases) from produced natural gas at gas fields. The absorbents used or suggested in the prior art have been different aqueous alkaline solutions, such as potassium carbonate and different amines, see e.g. U.S. Pat. Nos. 4,112,051, 4,397,660 and 5,061,465. Separation of $CO_2$ from exhaust gas from thermal power plants by means of an amine solution, is known e.g. from U.S. Pat. No. 4,942,734.

Common for these $CO_2$ capturing solutions is that the gas mixture to be separated is introduced countercurrent to the aqueous absorbent in an absorber column. The gas leaving the absorber column is $CO_2$ depleted (or acid gas depleted), whereas the $CO_2$ (or other acid gas) leaves the absorber column together with the absorbent. The absorbent is regenerated in the regenerator column and returned to the absorber column. Amine is regenerated by stripping the amine solution with steam in the regeneration column. The steam is generated in the reboiler at the base of the column.

The currently preferred absorbents are aqueous solutions of different amines. The commonly used amines are alkanol amines, such as e.g., monoethanol amine, diethanol amine, methyl-diethanolamine, piperazine, 2-amino-2-methyl propoanol, 2-metylaminoethanol, as well as other amines known by skilled man in the art. The absorption of $CO_2$ to the amine absorbents is a reversible, exothermic reaction. Accordingly, heat has to be supplied to the regenerator column to reverse the absorption and release the $CO_2$.

The vapor pressure and the solubility in water of the different amines varies considerably. Hence some amines are more likely to evaporate from aqueous absorbent solution and escape with the $CO_2$ lean flue gas to the surroundings.

There are also large variations between different amines with respect to chemical stability towards oxidative and thermal degradation of the amine. Degradation products may be aldehydes, organic acids, and nitrogen containing compounds such as other amines, amides, nitrogen oxides and ammonia. Some of the degradation products are on ionic form or high molecular compounds and tends to accumulate in the solvent, while other volatile degradation products have limited solubility and follows the flue gas or $CO_2$ product stream out of the capture plant system.

Recently a discussion on environmental or health hazards resulting from amines that are released from the plant together with the $CO_2$ lean exhaust gas has been raised.

Amine absorbers for $CO_2$ capture from flue gas are typically equipped with one or several water wash sections, where the main purpose is to reduce amine vapor slip to the atmosphere, see e.g. US2008159937. These water wash sections are normally either trays or packed bed sections with water recycling. The absorption of amine in the wash water section and corresponding amine concentration build-up requires a certain replacement of the wash water liquid, i.e. fresh water is added as make up and a bleed to the main amine solvent loop is established. The concentration of amine in the wash water must be maintained relatively low due to the amine vapour pressure (back pressure) from the wash water liquid. The vapour pressure is depending on the amine concentration and liquid temperature. Higher temperatures and higher amine concentrations cause higher amine vapour pressure from the liquid and thereby higher amine slip to air. One normally assumes equilibrium in the top of the water wash packed section with liquid recycling, meaning the gas will contain an amine concentration equivalent to the liquid vapour pressure, which again is dictated by the liquid temperature and amine concentration.

Adding excess amounts of fresh water to the water wash loop to dilute the solution, or operating with lower gas and liquid temperatures in order to reduce the amine vapour pressure, is challenging as the water balance over the entire capture plant must be maintained close to neutral. I.e. the sum of water coming into the system must balance the water leaving the system; otherwise the inventory will accumulate and must eventually be disposed off as waste. Both the use of excess amounts of water and operating at lower temperatures makes it difficult to achieve a near to zero amine vapor slip and this alternative operation will also have a significant increased cost impact.

Increased environmental awareness will generate a need for improved processes with minimum discharge to air of potential harmful compounds. It is therefore further anticipated that the authorities and industry is willing to incorporate such improvements as described herein.

The choice of an amine or a combination of amines for a plant for $CO_2$ capture depends on different factors such as corrosive effect, possible or known environmental or health hazards, efficiency in $CO_2$ capture, energy efficiency in the process, minimizing of amine degradation etc. If the amine slip into the atmosphere could be eliminated, amines that are harmful or not allowed due to environmental or health considerations related to amine slip, may be allowed in such processes.

There is therefore a need for improved methods and improved devices to eliminate or considerably reduce the slip of amines from $CO_2$ sequestration plants.

Ammonia, if present as a possible degradation product of amine, is an alkaline compound and behaves similar to the amine itself, but is however significantly more volatile. Ammonia produced by degradation of amines in the solvent tends to escape the capture plant system via the emitted flue gas in the same rate as it is produced, since the solubility of ammonia in the solvent and water wash is very limited and equilibrium concentration will be quickly obtained. The concentration of ammonia in the emitted flue gas may however in some cases be above environmental regulation requirements, and a method for controlling ammonia emission from amine based $CO_2$ capture plant is needed.

SUMMARY OF THE INVENTION

According to a first aspect, the present invention relates to a method for eliminating or substantially reducing emission of amines and alkaline degradation products thereof, to the atmosphere from a plant for $CO_2$ capture from a flue gas, where the $CO_2$ is captured by countercurrent flow to an absorbent in an absorption zone, the absorbent comprising an aqueous solution of one or more amine(s), to give a $CO_2$ lean flue gas that is released into the surroundings, and a $CO_2$ rich absorbent that is regenerated in a regeneration column to give a $CO_2$ rich gas that is treated further, and regenerated absorbent that is recycled to the absorption zone, wherein the $CO_2$ lean flue gas is washed with an acidic aqueous solution to remove or substantially reduce the amount of amine(s) and alkaline degradation products thereof in the gas.

In a water wash system using water only, the pH in the solution increases by the absorption of amine, causing increased amine vapor pressure in the liquid phase.

The acid in the acidic wash step protonates and thus stabilises the amines, and other alkaline compounds, in solution resulting in a substantial reduction of the vapor pressure of amine in the liquid phase, and a correspondingreduction of amine slip to the atmosphere.

Dissolved $CO_2$ is acidic and $CO_2$ absorption in the wash water reduces the amine vapour pressure to some degree as it ties up the amine as carbamates or protonated amines. The absorption rate of $CO_2$ is, however, low and the $CO_2$ partial pressure in the flue gas in the upper part of the absorber is low, hence the amount of absorbed $CO_2$ in the wash water section is not sufficient to eliminate the amine backpressure.

The present method solves the fundamental challenge of amine slip that is a result of a lack of buffer capacity and solvent backpressure when using pure water wash of the $CO_2$ lean flue gas.

According to a first embodiment of the first aspect, the amine(s) and degradation products comprise nitrosamines. Nitrosamines may be a result of degradation of other amines, or may be present in the amines received from the supplier as contaminants resulting from the production process. Nitrosamines are a group of chemical compounds of which a major part are suspected to be carcinogenic. The possible emission of nitrosamines from amine based plants for $CO_2$ capture has therefore raised an environmental concern. The present invention is a solution to this problem by reducing the amount of any nitrosamines in the $CO_2$ lean flue gas substantially.

According to an embodiment of the first aspect of the invention, a part of the acid washing solution is bled off and introduced into an amine reclaimer where amine salts in the solution are boiled in the presence of alkali and the amine cations are liberated as free amine vapor which is reused as amine absorbent for $CO_2$ capture. The concentration of amine compounds, and any degradation products thereof, such as e.g. ammonia, that are absorbed by the acid washing solution, are built up in the washing solution. To avoid too high levels of dissolved salts, a part of the washing solution is bled off. By introducing the amine reclaimer, the amine that is captured by the acid wash is treated to obtain free amine that is reintroduced to the amine cycle and thus recycled. The amine cycle is understood to be the cycle in which the amine circulates, i.e. from the absorption zone, to the regeneration column and back to the absorption zone. The free amine released in the reclaimer is preferably introduced together with steam generated in the reclaimer into the regeneration column.

According to an alternative embodiment, if significant amounts of ammonia are tied up as ammonium in the washing solution, a separate stage for selective ammonium separation from the acid washing solution is preferred. The free amine and ammonia released in the reclaimer by use of an alkali are introduced to a fractionating column, where steam and amine are condensed and routed to the main amine solvent loop, while ammonia is recovered as gaseous product. Alternatively, the bleed of washing solution is introduced into a pre-reactor where the washing solution is reacted with an alkali and stripped for ammonia from the washing solution before the washing solution is introduced into the amine reclaimer. Ammonia is significantly more volatile and has a lower pKa value compared to amines. A part of the washing solution is bled off and introduced into a pre-reactor where the solution is reacted with an alkali and most of the ammonium ions are converted to ammonia which can be selectively stripped off from the solution, either by vacuum stripping or by bubbling air through the solution at ambient temperature and pressure. The stripping air is subsequently treated for ammonia recovery or routed through a solution of acid for capturing the ammonia as ammonium ions, while the remaining washing solution is routed to the amine reclaimer and boiled in the presence of additional alkali in order to liberate amines, which are transferred back to the main amine solvent loop.

According to an alternative embodiment, a part of the acid washing solution is bled off and introduced into the amine absorbent for $CO_2$ capture. According to this embodiment, the bled off acid washing solution is introduced into the amine absorbent to be treated as the rest of the circulating absorbent. The circulating amine is filtered to remove particles and a minor amount is bled off (continuously or batchwise) and introduced into a reclaimer to recover free amine that is returned to the amine cycle, and to remove non-volatile impurities from the circulating amine.

According to a second aspect, the present invention relates to an absorber for treating a flue gas to capture $CO_2$, comprising an inlet line for the flue gas, liquid distributors connected to a lean absorbent line, for distribution of an amine absorbent over an absorption zone to allow countercurrent flow of the flue gas against the amine absorbent in the contact zone, one or more water washing zone(s) where water is introduced over the contact zone to wash the flue gas, and a gas exit line for releasing the treated flue gas into the surroundings, wherein an acid washing zone arranged between the washing zone(s), and a gas exit line, over which zone distributors connected to an acid wash line are arranged for introduction of an aqueous acid solution over the acid washing zone to allow contact between the aqueous acid solution and the flue gas.

According to this aspect, the invention relates to an improved system for elimination of amine vapor slip to atmosphere. An acid wash section is arranged after an optional water wash section. The major part of the volatile amines released in the $CO_2$ absorption zone are captured in the optional water wash section and transferred back to the amine absorbent through a liquid bleed from the water wash section to the absorbent zone. The purpose of the downstream acid wash section is flue gas polishing prior to discharge to the surroundings. In this acid wash section alkaline compounds in the flue gas (e.g. amines, ammonia and other alkaline impurities such as nitrosamines) are captured by a slightly acidic solution. The pH in this wash section in the top of the $CO_2$ absorber will be controlled by adding an appropriate acid in stoichiometric amounts relative to the amine and alkaline compounds captured.

SHORT DESCRIPTION OF THE FIGURES

DETAILED DESCRIPTION OF THE INVENTION

Figure 1:
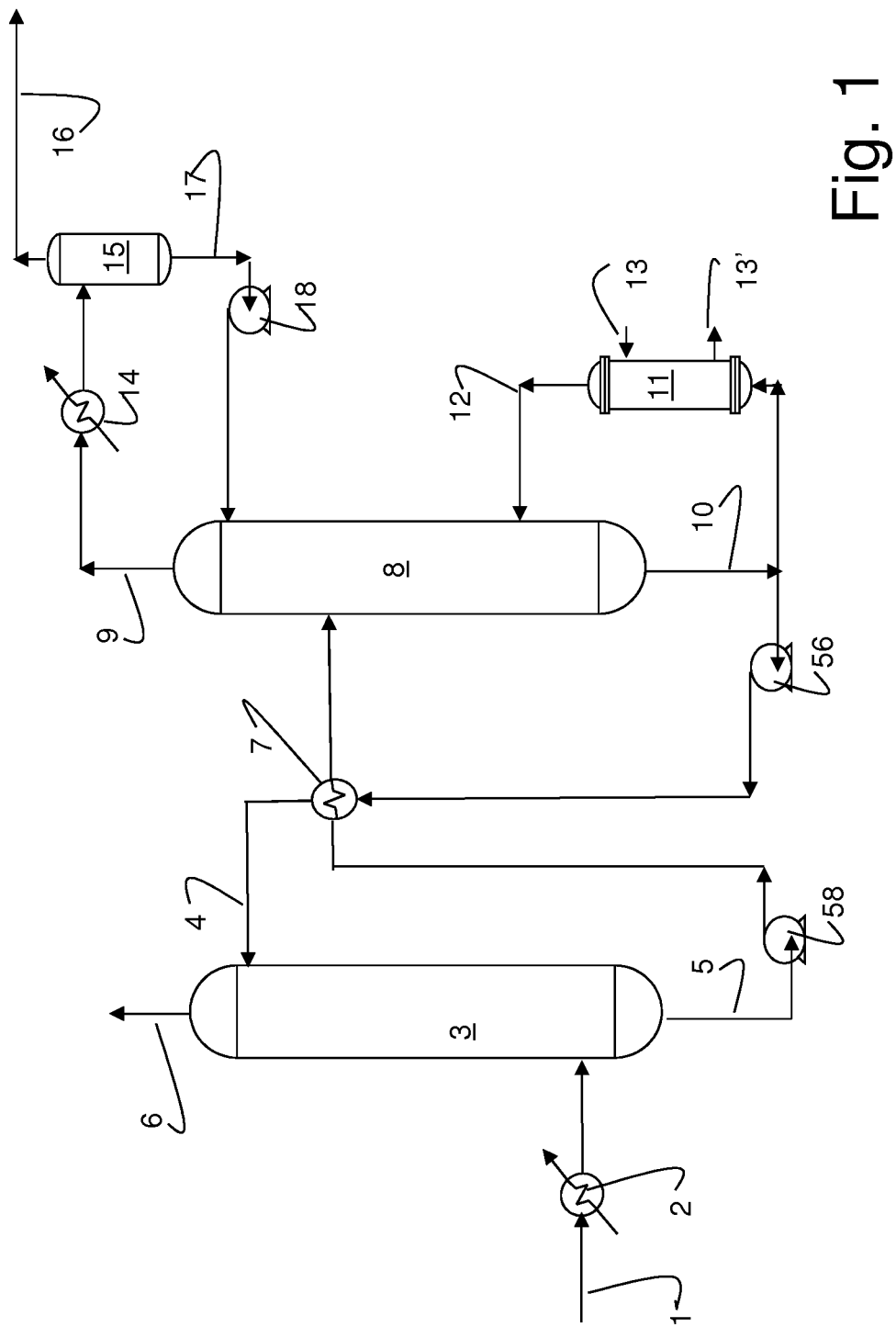
FIG. 1 illustrates a $CO_2$ sequestration plant according to the prior art.

FIG. 1 illustrates a $CO_2$ capturing plant according to the prior art, where exhaust gas from combustion of carbonaceous fuel enters the $CO_2$ capturing plant through an exhaust line 1. Prior to the $CO_2$ capture plant, the flue gas will typically be treated by conventional air pollution control devises such as electrostatic precipitators (ESP), Flue Gas Desulfurisation (FGD) and Selective Catalytic NOx Reduction (SCR) units to control the emission of particles, SOx and NOx. The composition and temperature of the flue gas is greatly dependent on the source thereof. Accordingly, the required pretreatment of the flue gas is dependent on the fuel and the combustion technology of the plant.

The temperature of the exhaust entering the $CO_2$ capture plant through line 1 is normally from about 120° C. to about 30° C. The flue gas may be introduced into a cooler 2. A preferred cooler 2 is a Direct Contact Cooler (DCC), in which the gas is cooled and further purified of SOx and dust and saturated with water at a temperature from about 20° C. to about 50° C. The DCC is typically a wet scrubber with water recycling through a packed bed, and alkaline sodium compounds are added for pH adjustment and SOx control.

The exhaust gas is then introduced into the lower part of an $CO_2$ absorption tower 3 in which the exhaust gas flows from the bottom to the top of the absorption tower 3 countercurrent to a lean absorbent, i.e. absorbent that is stripped for $CO_2$, that is introduced into the upper part of the absorption tower through a lean absorbent line 4. $CO_2$ lean gas, i.e. exhaust gas where a substantial part of the $CO_2$ is removed, is removed through a gas exit 6 at the top of the absorption tower, whereas rich absorbent, i.e. absorbent having absorbed the majority of the $CO_2$, is removed from the absorption tower through a rich absorbent line 5.

The rich absorbent is routed via a pump 48 and is heated against lean absorbent that is returned to the absorption tower in a heat exchanger 7, to a temperature typically in the range between 90 and 110° C., before the rich absorbent is introduced into a regenerator column 8. In the regenerator column 8 the rich absorbent flows downwards, countercurrent to steam generated by heating some of the absorbent in a regeneration reboiler 11. Lean absorbent leaves the regenerator column through a lean absorbent outlet 10. A part of the lean absorbent in the outlet 10 is introduced into the regeneration reboiler 11 where it is heated to a temperature typically in the range between 110 and 130° C., to produce hot absorbent and steam which is re-introduced into the regenerator column through a line 12. The lean absorbent in the reboiler 11 is typically heated by means of a heating medium, such as steam. When using a heating medium for heating the absorbent in the regeneration reboiler, the heating medium is introduced through a line 13 and removed through a line 13'. Steam as a heat medium for the reboiler is normally introduced as a low pressure steam at a temperature of 130° C. to about 140° C., and leaves through line 13' as condensed steam at the same temperature. In other words, the energy transferred from the heat medium to the absorbent in the reboiler is the heat of condensation of the steam.

The heating of the column from the bottom gives a temperature gradient at steady state from the bottom to the top of the column, where the temperature at the top is from 10 to 50° C. lower than at the bottom, depending on the actual design of the column.

The lean absorbent in line 10 that is not introduced into the regeneration reboiler, is recycled back via a pump 56 to the absorption column 3 through the line 4 and cooled in the heat exchanger 7 against rich absorbent in the line 5. In the heat exchanger 7 the relatively cold rich absorbent is heated against the relatively hot lean absorbent leaving the stripper at a temperature of about 120° C. Depending on the actual dimensioning and construction of the plant, the temperature of the rich amine leaving the heat exchanger 7 for the amine stripper may be from about 90 to about 110° C. The stripper is normally operated at a small over pressure, typically 0.5 to 1.5 bar higher than the ambient pressure.

$CO_2$ released from the absorbent, water vapor and minor amounts of absorbent, are withdrawn from the regenerator column 8 through a gas withdrawal line 9. The gas in the gas withdrawal line 9 is cooled in a reflux condenser 14 to condense water that is separated from the remaining gas, mainly comprising $CO_2$ in a $CO_2$ separator 15. $CO_2$ gas and some remaining water vapor is removed from the $CO_2$ separator 15 through a $CO_2$ line 16 for further treatment, such as drying, compression and deposition. The condensed water in the $CO_2$ separator is withdrawn through a line 17 and pumped back to the top of the regeneration column 8 by means of a pump 18.

Figure 2:
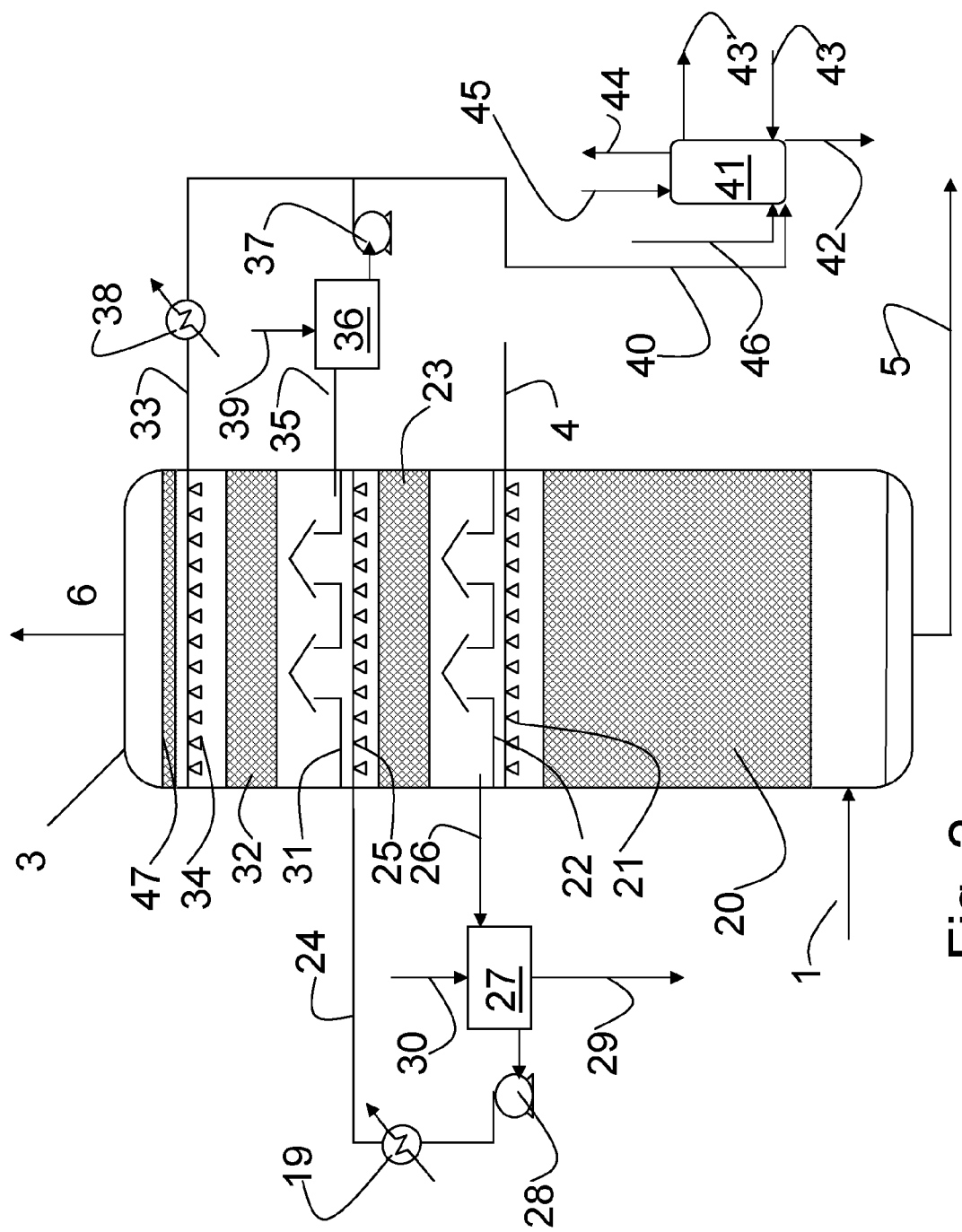
FIG. 2 is a principle sketch illustrating a contactor or absorption tower according to the present invention.

FIG. 2 is a principle sketch of a contactor or absorption column 3 modified according to the present invention. The absorption column is divided into three compartments by means of collector plates 22, 31.

The exhaust gas to be treated is introduced into the column through the exhaust line 1 and is allowed to flow upwards through a contact zone 20 preferably comprising a packing, such as a structured packing, to increase the gas-liquid contact surface area. In the contact zone the exhaust gas flows in countercurrent flow to a liquid absorbent that is introduced through the lean absorbent line 4 and is distributed over the packing in the contact zone by liquid distributors 21. The liquid distributors may be any kind of liquid distributors known by the skilled man in the art, such as nozzles, perforated pipes, troughs etc.

In the contact zone a substantial part, such as more than 70%, and preferably more than 80% of the $CO_2$ in the exhaust gas introduced into the column is absorbed by the liquid absorbent to leave a $CO_2$ depleted exhaust gas. The absorbent is collected at the bottom of the absorption column and is drawn out from the column through the rich absorbent line 5 as described above with reference to the prior art.

The CO$_2$ lean exhaust gas flows upwards and through the collector plate 22 and into a washing zone 23 where the exhaust gas is washed by countercurrent flow to water in a packing. The washing water is introduced through a washing water line 24 and distributed over the packing in the washing zone 23, by means of water distributors 25. The water distributors are of the same kind or different from the liquid distributors 21.

Washing water is collected at the collector plate 22 and is withdrawn through a water line 26 and introduced into a washing water tank 27. The water in the tank 27 may be recycled to the washing water line 24 by means of a pump 28. Depending on the entire water balance in the capture plant, it is normally desired to utilize the water wash section for gas cooling in order to condense and remove water from the passing flue gas. This is obtained by an external cooler 19 on the recycling wash water. To drain excess liquid and/or to avoid building up a too high concentration of amine and possible other contaminants in the circulating washing water, a water bleed line 29 is provided. A water line 30 is also provided to replace any water loss and the loss through the bleed line 29. The source of water for line 30 may be condensate taken from the CO$_2$ separator 15 through line 17, see FIG. 1. Using condensed water from the process is preferred to avoid disturbing the water balance in the process, i.e. to avoid adding access water to the process or to remove too much water.

The water bleed line 29 and water line 30 may be connected to the tank 27 as illustrated but the lines 29, 30 may also be provided at any convenient position in the water washing recycling loop. The water bleed line 29 is routed back to the main amine cycle.

The washed CO$_2$ lean exhaust gas leaving the washing zone 23 flows upwards and through the collector plate 31 and into an acid washing zone 32 where the CO$_2$ depleted and washed exhaust gas is washed with an acidic aqueous solution in a packing. The acid aqueous solution has preferably a pH of about 3-7, and more preferably in the range 4 to 6. In a typical embodiment, the aqueous solution comprises an acid selected from the group consisting of sulphuric acid, phosphoric acid, nitric acid, acetic acid, formic acid, and citric acid. The acid solution is introduced through an acid wash line 33 and distributed over the packing in the acid washing zone 32, by means of distributors 34. The distributors 34 are of the same kind or different from the liquid distributors 21. The skilled man will understand that even though a countercurrent flow acid wash in a washing zone 32 is described, any convenient gas washing technology such as bubble bed tray may be used.

The cleaned exhaust gas leaving the contact zone 32 is then passed through one or more demister(s) 47 before the exhaust is released into the surroundings through the gas exit 6. The demisters may be of any impingement type such as mesh pad type, vane type, chevron type, etc.

Liquid from the contact zone 32 is collected by the collector plate 31 and is withdrawn through a line 35 into an acid wash tank 36. The solution in tank 36 is recycled into line 33 by means of a pump 37. An optional heater or cooler 38 may be provided in line 33 to adjust the temperature of the solution in line 33.

The wash liquid is recycled in a closed loop, where the pH is monitored continuously and acid is added as required via line 39. The recycling liquid in the acid wash system is collected in a dedicated sump inside the absorber tower, or alternatively an outside tank and routed via the recycle pump back to the top of the polishing section. The skilled man in the art will understand that the acid may be added at any convenient position in the acid washing loop.

This acid wash section is preferably operated adiabatic or close to adiabatic, with the aim to produce a small bleed with relatively high concentration of amine-acid compounds. The concentration of dissolved compounds can be monitored by continuous conductivity measurement, and the bleed rate versus the concentration strength can be adjusted by minor heating or cooling of the liquid recycle loop. Cooling will cause accumulation of liquid in the acid wash loop as water will condense from the passing flue gas, heating on the liquid recycle loop with cause net evaporation and loss of water. The concentration could also be controlled by adding fresh water to this section.

To control the build-up of neutralized amine and possible other contaminants in the circulating solution, a bleed line 40 is provided. The solution that is removed through bleed line 40 may be disposed or may be treated further to reduce, eliminate or recover any environmentally unwanted ingredients therein. The solution in bleed line 40 may be further treated by introduction into a so-called amine reclaimer 41 for recovery of amines.

The amine reclaimer 41 may be a reclaimer for the washing solution bleed only. To reduce cost and complexity of the plant, it is preferred that the reclaimer 41 is a reclaimer for reclaim 1ng or regenerating amine absorbent from both the washing solution bleed in line 40, and for a bleed of the lean absorbent that is withdrawn from the regenerator 8 through line 10.

An amine reclaimer 41 is an optional component in an amine based CO$_2$ capture plant, for reclaim 1ng or regenerating amine that has been made inactive by forming salts with other ions in the circulating absorbent. Conventionally, the reclaimer 41 is a boiler wherein amine solution to be reclaimed is boiled off, or evaporated, at elevated temperatures by means steam or other heat source that is introduced through line 43. If steam is used for heating the content in the reclaimer, condensed steam is withdrawn through a line 43'. Steam and evaporated amine is withdrawn through a return line 44 and may be transferred into the lower part of the regeneration column 8, hence introducing the content as additional stripping steam in the regeneration column 8.

The reclaimer may either be run at a continuous basis, where a minor amount, typically about 0.5 to 2.0%, of the lean absorbent leaving the regeneration column in line 10, is bled through a lean absorbent bleed line 46 and is introduced into the reclaimer 41. Alternatively, the reclaimer may be run batch wise. To reclaim, or regenerate the aqueous solutions that are introduced into the reclaimer through lines 40, 46, an alkaline solution is added through an alkaline line 45. Preferably an alkaline sodium solution, such as sodium hydroxide or sodium ash, is used as the alkaline solution. Dissolved salts, possibly precipitated salts, other non-volatile degradation products and any other particulate matter are collected at the bottom of the reclaimer 41 and are removed through a waste line 42.

Figure 3:
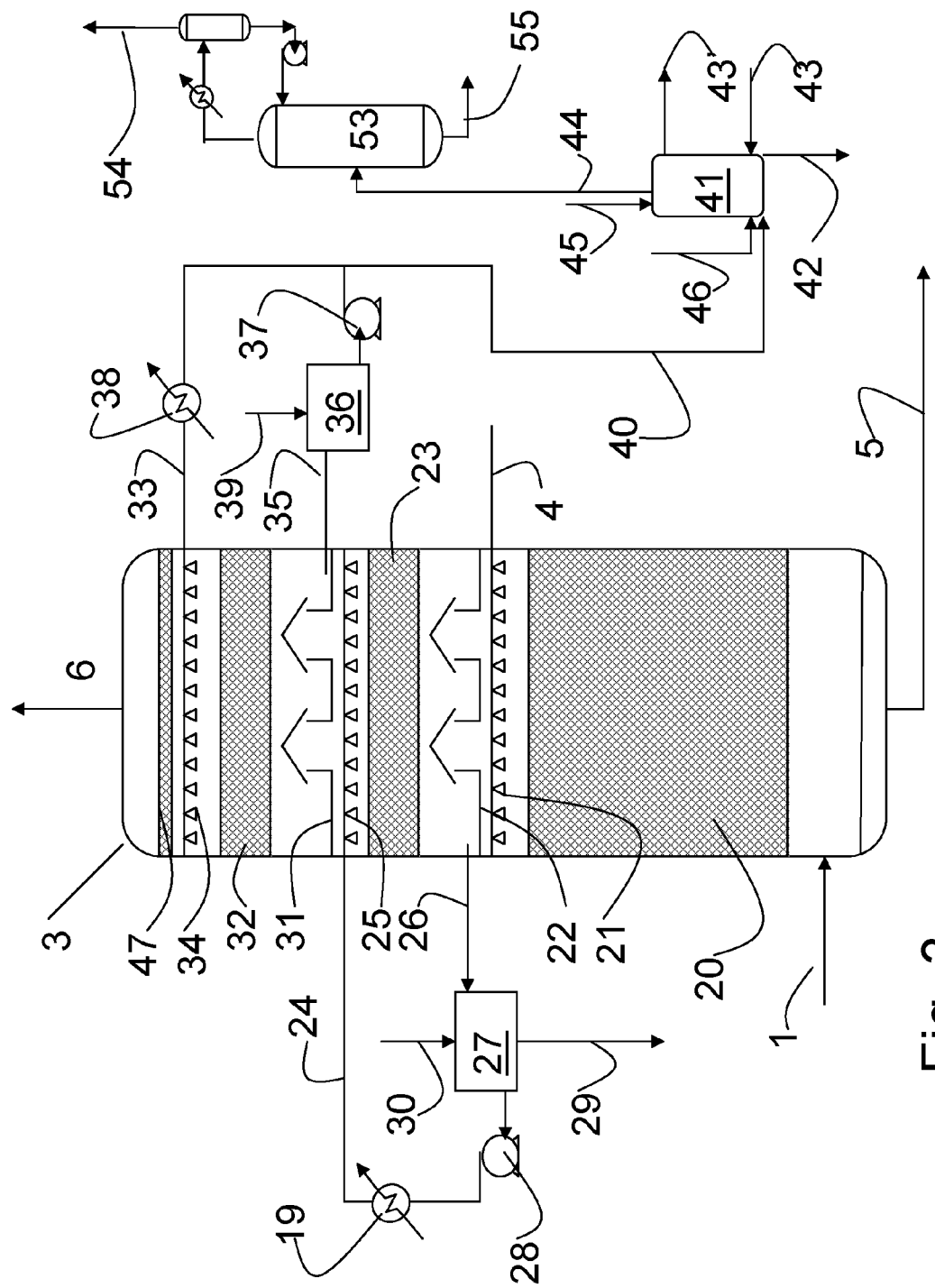
FIG. 3 is a principle sketch of a first alternative embodiment of the invention as illustrated in FIG. 2.

FIG. 3 illustrates an embodiment of the present invention. Depending on the amine(s) used for the absorbent and the operating conditions for the plant, ammonia may be produced by degradation of amines in the solvent. Ammonia present in the gas at the top of the absorber will be captured by the acid wash together with amines. Ammonia present in the acid washing solution bleed recovered in the reclaimer 41, will due to the high vapour pressure of ammonia, evaporate in the reclaimer and follow the reclaimed amines and steam that are withdrawn through line 44 to be introduced into the regenerating column 8 as described above. This will result in ammonia build-up in the solvent and in the aqueous acid washing solution, which in turn results in excessive consumption of acid and caustic in the acid wash system and reclaimer system, respectively.

To avoid the concentration of ammonia building up in the absorbent, the gas withdrawn through line 44 is treated in an optional fractionating column 53 where ammonia is separated from the distillate, consisting of amine and water. The amine and water is routed to the main solvent loop through line 55, while ammonia is withdrawn through a line 54 for disposal or utilized for other purposes such as SCR de-NOx applications.

Figure 4:
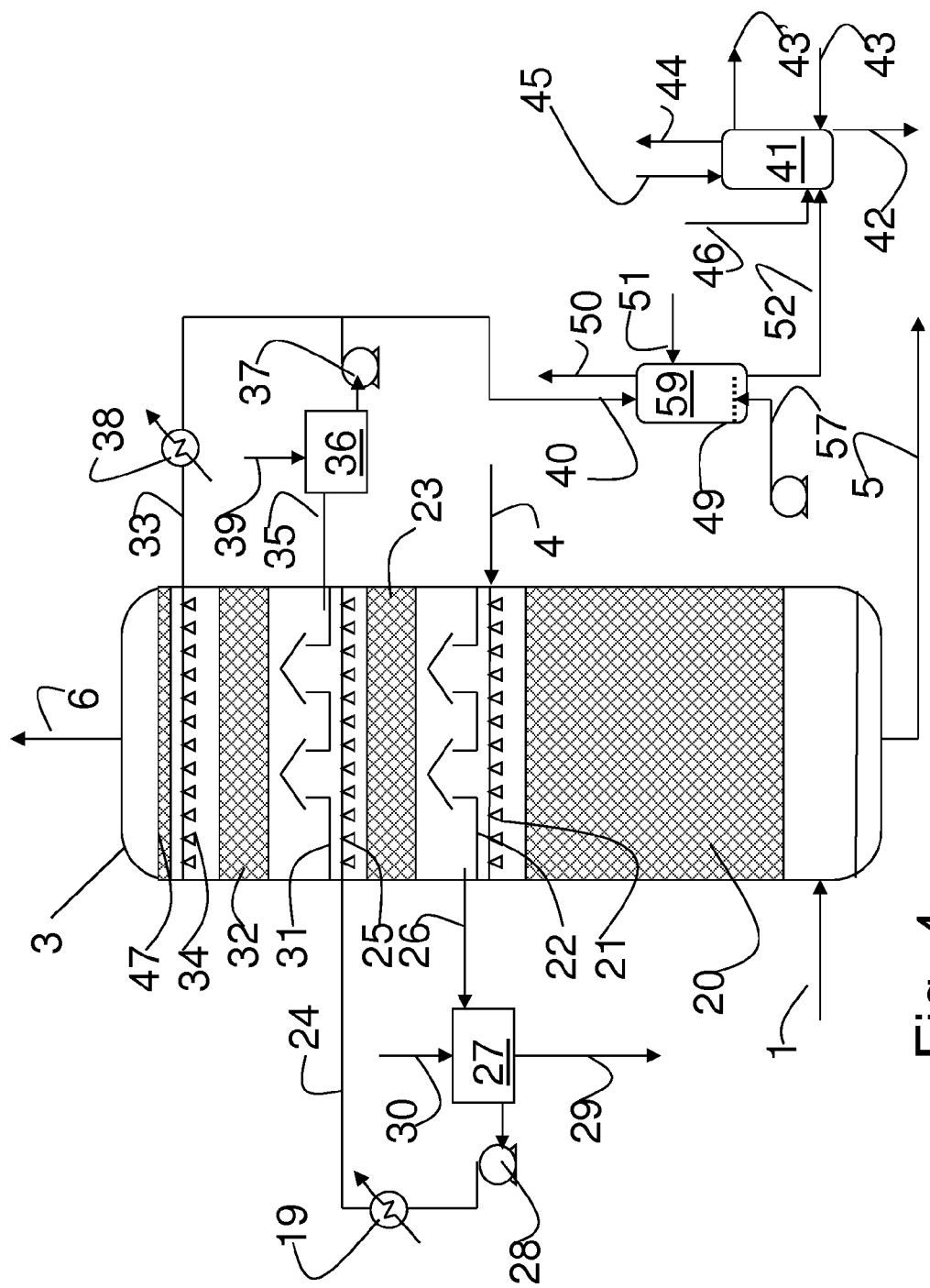
FIG. 4 is a principle sketch of a second alternative embodiment of the invention as illustrated in FIG. 2.

FIG. 4 illustrates another embodiment of the present invention, where an optional pre-reactor 59 for ammonia removal is introduced upstream of the reclaimer 41. In the pre-reactor alkali is added through a line 51 and ammonia is removed. Stripping by vacuum stripping or by a stripping medium such as air introduced into the pre-reactor 59 through a gas line 57 will improve the unit efficiency. A sparger 49 may be arranged in the pre-reactor 59 to distribute the stripping gas introduced into the pre-reactor to ensure efficient contact between the stripping gas and the liquid in the pre-reactor.

Ammonia released from the solution and possibly stripping gas are vented off from the pre-reactor through a vent line 50 and treated for ammonia recovery, or treated in a scrubber for absorption of ammonia using an acidic absorbent, such as sulfuric acid. If sulfuric acid is used, the resulting ammonium sulfate may be used in other processes.

A portion of the alkali required to obtain a stoichiometric reaction with ammonium and protonated amine is added to the pre-reactor 59 for ammonia removal and the remaining portion of alkali is added to the amine reclaimer vessel 41, when a pre-reactor 59 is used.

The reclaimer principle described herein is of the thermal type, other amine reclaimer alternatives such as ion exchange or dialysis may be applied in conjunction with the described invention as well. In an ion exchange amine recovery unit, the anions in the aqueous acid washing solution are exchanged with hydroxyl groups attached to the exchanger resin, hence the ammonium and protonated amine are neutralized so that the alkalinity function is restored. The ammonia can then be stripped off from the solution by vacuum stripping or a stripping medium such as air, while the remaining solution containing free amines can be routed back to the capture plant. The exchanger resin is periodically regenerated by treatment with an alkaline solution such as sodium hydroxide.

Aqueous amine and ammonium solutions may also be treated by certain bacteria that will cause bacteriologic decomposition of the amines and ammonia and the protonated ions thereof. Biological de-nitrification of ammonium is well known technology in the waste water treatment industry.

Several acids are available for the aqueous acid washing solution, both inorganic and organic acids, such as sulphuric acid, phosphoric acid, nitric acid, acetic acid, formic acid, carbonic acid, citric acid, etc. Carbonic acid means liquid solution that is supersaturated with $CO_2$. Carbonic acid can be produced in situ by boosting the $CO_2$ concentration in the acid wash water system by injecting concentrated $CO_2$ in the circulating liquid, using water that has been contacted with $CO_2$ gas at high pressure, or by addition of bicarbonate salts. The condensate from the stripper overhead condenser, or condensate from the $CO_2$ compressor intercoolers, are highly enriched in $CO_2$ and hence viable sources for make up solution to the acid wash system, where additional acid is added within the acid wash system to obtain a pH in the preferred range.

Independent of type of acid or mix of acids used, the preferred pH in the acid wash system is in the range 3-7, and more preferably in the range 4-6, sufficiently low to completely protonate amines and $NH_3$ to ammonium ions, and by then eliminating the vapour pressure of amines and ammonia above the solution. Another positive effect of the reduced pH by the acid washing section is a possible reduction or avoidance of Legionella growth. If Legionella appears to be a problem in the water wash sections in $CO_2$ absorbers (like the experience from other cooling towers) it may be preferable to operate the acid water wash section at the lower end of the recommended pH range of 3-7, or even slightly below pH 3. The skilled man reading the present description will be able to select a suitable acid mixture and a suitable pH range for the aqueous acid washing solution without any undue experimentation or testing.

As described above, the concentrated bleed from the acid wash is routed to a storage tank or to a reclaimer where the amine is recovered and thereby reducing amine losses, by adding alkaline compounds, such as sodium ash or sodium hydroxide. As indicated in this example, where sulfuric acid is applied for the acid wash purpose as an example, the alkaline sodium compound reacts with the sulphuric acid anions, e.g.

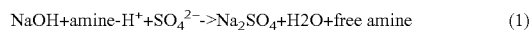

$$NaOH + amine\text{-}H^+ + SO_4^{2-} \rightarrow Na_2SO_4 + H2O + \text{free amine} \quad (1)$$

If ammonia is released by degradation of the solvent and captured in the acidic wash as ammonium, ammonia is released by reaction with the alkaline sodium compound in the same was as amines:

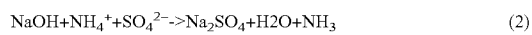

$$NaOH + NH_4^+ + SO_4^{2-} \rightarrow Na_2SO_4 + H2O + NH_3 \quad (2)$$

The pKa value for ammonia is significantly lower than the pKa values for amines, hence reaction (2) is favored over reaction (1). Ammonia is also much more volatile compared to amines. Hence ammonia can be stripped almost selectively from a liquid solution containing ammonia and more soluble amines such as alkanol amines, by performing the stripping at room temperature and pH in the range of 9.0 to 9.5.

If carbonic acid is applied for the acid wash system, the recovery of amine and ammonia can be performed without addition of alkali by simply boiling the liquid bleed from the acid wash and subsequently separate the $CO_2$ and ammonia from the liquid phase in a fractionating column according to FIG. 3. The liquid phase is returned to the main solvent loop, while CO2 and ammonia are removed from the process.

The liquid bleed from the acid wash could alternatively be routed back to the amine cycle for further treatments.

The skilled man will understand that the contact zones 20, 23, 32 preferably are trays or packed contact zones comprising a packing material that increases the contact area between gas and liquid. The packing material may be any well known packing material and may be arranged randomly or structured. The most preferred packing materials are structured packing made of materials that are substantially inert to the gas and absorbent used.

The skilled man will also understand that the described absorption column is simplified for illustrative purposes. Each contact zone 20, 23, 32 may be divided horizontally in two or more stages if necessary or desirable. If a contact zone 20, 23, 32 is divided horizontally, a collector plate may be used to separate the different stages or liquid re-distributors may be installed in between.

The collector plates 22 and 31 may be of the same or of different types, such as any type of liquid collection system known by the skilled man in the art, allowing the exhaust gas to flow upwards in the column but that do not allow liquid to flow downwards so that the collected liquid may be withdrawn through respective withdrawal lines 26, 35.

Example 1

A pilot scale $CO_2$ capture plant according to FIG. 1 was used for the tests. 30 wt % MEA solvent was applied for capturing $CO_2$ from a gas turbine exhaust gas. The $CO_2$ absorber consists of a main absorption zone, where 90% $CO_2$ capture was achieved.

The flue gas leaving the absorption zone contained 80-100 ppm of gaseous MEA and the flue gas temperature was in the range 50-55° C. A single water wash section with structured packing was applied for reduction of amine slip to the surroundings. The recycling water was cooled by an external heat exchanger, causing cooling on the passing flue gas and the temperature on the gas leaving the water wash section was in the range 45-50° C. Condensation of water took place in the wash water section, and the excess liquid in the water wash liquid recycling loop was routed to the main amine circulation loop. Steady state conditions for the water wash system (i.e. constant temperature profiles and constant gas and liquid concentrations) was achieved and the MEA content in the exit gas was measured to be approximately 0.7 ppm.

Subsequently, sulfuric acid was added to reduce the pH of the recycling water wash liquid to below 6. The MEA concentration in the flue gas dropped to below detection limits, which was said to be 0.05 ppm. The analyses were performed by gas extraction through a series of impingers with pure water and subsequent LC-MS analysis of the impinger content.

Example 2

A pilot scale $CO_2$ capture plant according to FIG. 1 was used for the tests. 30 wt % MEA solvent was applied for capturing $CO_2$ from flue gas from a coal fired power station. The $CO_2$ absorber consists of a main absorption zone, where 90% $CO_2$ capture was achieved.

The flue gas leaving the absorption zone contained 90-100 ppm of gaseous MEA and the flue gas temperature was in the range 55-57° C. A single water wash section with structured packing was applied for reduction of amine slip to the surroundings. The recycling water was cooled by an external heat exchanger, causing cooling on the passing flue gas and the temperature on the gas leaving the water wash section was in the range 45-50° C. Condensation of water took place in the wash water section, and the excess liquid in the water wash liquid recycling loop was routed to the main amine circulation loop. Steady state conditions for the water wash system (i.e. constant temperature profiles and constant gas and liquid concentrations) was achieved and the MEA content in the exit gas was measured to be approximately 0.7 ppm. The concentration of ammonia was measured by online FTIR to be around 30 ppm (wet). A specialist company carried out emission measurements for specific nitrosamine compounds, and detected 0,4 ug/Nm3 of N-Nitrosomorpholin in the emitted flue gas.

Subsequently, sulfuric acid was added to reduce the pH of the recycling water wash liquid to below 6. The MEA concentration in the flue gas dropped to below detection limits, which was said to be 0.05 ppm. Ammonia concentration, recorded by the online FTIR, decreased to below 1 ppm. No N-Nitrosomorpholin was detected in the emitted flue gas.

The MEA analyses were performed by gas extraction through a series of impingers with pure water and subsequent LC-MS analysis of the impinger content. The sample train for nitrosamines measurement included a condensate trap, a Thermosorb/N cartridge and a backup Thermosorb/N cartridge.

The invention claimed is:

1. A method for eliminating or substantially reducing emission of amines and alkaline degradation products thereof to the atmosphere from a plant for $CO_2$ capture from a flue gas, the method comprising:
   introducing the flue gas into an absorber;
   allowing the flue gas to flow countercurrent to an absorbent comprising an aqueous solution of one or more amine(s) in an absorption zone for capturing the $CO_2$ to form a $CO_2$ lean exhaust gas and a $CO_2$ rich absorbent;
   collecting the $CO_2$ rich absorbent;
   regenerating the $CO_2$ rich absorbent in a regeneration column to give a $CO_2$ rich gas and a regenerated absorbent;
   withdrawing the $CO_2$ rich gas for further treatment;
   recycling the regenerated absorbent to the absorption zone;
   washing the $CO_2$ lean exhaust gas with an aqueous solution comprising an acid selected from the group consisting of sulphuric acid, phosphoric acid, nitric acid, acetic acid, formic acid, and citric acid, to remove or substantially reduce an amount of amine(s) and alkaline degradation products thereof in the $CO_2$ lean exhaust gas; and
   wherein a part of the aqueous solution comprising the acid is bled off to a tank for further treatment with an alkaline solution, ion exchange, dialysis or bacterial decomposition.

2. The method according to claim 1, wherein the $CO_2$ lean flue gas is washed by the acidic aqueous solution in a tray or in a packed bed washing zone with liquid recycle.

3. The method according to claim 1, wherein a part of the acid washing solution is bled off and introduced into an amine absorbent for $CO_2$ capture.

4. The method according to claim 1, wherein make-up water containing carbonic acid is supplied to a washing system from condensed water and where additional acid is added to obtain a required pH.

5. The method according to claim 1, wherein a heat exchanger in an acid water wash loop is used to control water volume and concentration of dissolved compounds in the water.

6. The method according to claim 1, wherein one or more washing steps where the $CO_2$ lean exhaust gas is washed by means of water is (are) arranged between the absorption zone for absorption of $CO_2$ and an acid wash section.

7. A method for eliminating or substantially reducing emission of amines and alkaline degradation products thereof to the atmosphere from a plant for $CO_2$ capture from a flue gas, the method comprising:
   introducing the flue gas into an absorber;
   allowing the flue gas to flow countercurrent to an absorbent comprising an aqueous solution of one or more amine(s) in an absorption zone for capturing the $CO_2$ to form a $CO_2$ lean exhaust gas and a $CO_2$ rich absorbent;
   collecting the $CO_2$ rich absorbent;
   regenerating the $CO_2$ rich absorbent in a regeneration column to give a $CO_2$ rich gas and a regenerated absorbent;
   withdrawing the $CO_2$ rich gas for further treatment;
   recycling the regenerated absorbent to the absorption zone;
   washing the $CO_2$ lean exhaust gas with an aqueous solution comprising an acid selected from the group consisting of sulphuric acid, phosphoric acid, nitric acid, acetic acid, formic acid, and citric acid, to remove or substantially reduce an amount of amine(s) and alkaline degradation products thereof in the $CO_2$ lean exhaust gas;

wherein a part of an acid washing solution is bled off and introduced into an amine reclaimer where amine salts in solution is boiled in the presence of alkali to liberate amine cations as free amine vapor which is reused as amine absorbent for $CO_2$ capture; and wherein steam and gaseous amine from the reclaimer is routed to a fractionating column for separation of gaseous ammonia from water and amine distillate.

8. The method according to claim 7, wherein the $CO_2$ lean exhaust gas is washed by the acidic aqueous solution in a tray or in a packed bed washing zone with liquid recycle.

9. The method according to claim 7, wherein a part of the acid washing solution is bled off and introduced into an amine absorbent for $CO_2$ capture.

10. The method according to claim 7, wherein make-up water containing carbonic acid is supplied to a washing system from condensed water and where additional acid is added to obtain a required pH.

11. The method according to claim 7, wherein a heat exchanger in an acid water wash loop is used to control water volume and concentration of dissolved compounds in the water.

12. The method according to claim 7, wherein one or more washing steps where the $CO_2$ lean exhaust gas is washed by water are arranged between the absorption zone for absorption of $CO_2$ and an acid wash section.

13. A method for eliminating or substantially reducing emission of amines and alkaline degradation products thereof to the atmosphere from a plant for $CO_2$ capture from a flue gas, the method comprising:

introducing the flue gas into an absorber;

allowing the flue gas to flow countercurrent to an absorbent comprising an aqueous solution of one or more amine(s) in an absorption zone for capturing the $CO_2$ to form a $CO_2$ lean exhaust gas and a $CO_2$ rich absorbent;

collecting the $CO_2$ rich absorbent;

regenerating the $CO_2$ rich absorbent in a regeneration column to give a $CO_2$ rich gas and a regenerated absorbent;

withdrawing the $CO_2$ rich gas for further treatment;

recycling the regenerated absorbent to the absorption zone;

washing the $CO_2$ lean exhaust gas with an aqueous solution comprising an acid selected from the group consisting of sulphuric acid, phosphoric acid, nitric acid, acetic acid, formic acid, and citric acid, to remove or substantially reduce an amount of amine(s) and alkaline degradation products thereof in the $CO_2$ lean exhaust gas;

wherein a part of an acid washing solution is bled off and introduced into an amine reclaimer where amine salts in solution is boiled in the presence of alkali to liberate amine cations as free amine vapor which is reused as amine absorbent for $CO_2$ capture; and wherein bleed of washing solution is introduced into a pre-reactor, wherein the washing solution is reacted with an alkali and stripped by vacuum or introduction of a stripping gas selectively to remove ammonia from the washing solution before the washing solution is introduced into the amine reclaimer.

14. The method according to claim 13, wherein the $CO_2$ lean exhaust gas is washed by the acidic aqueous solution in a tray or in a packed bed washing zone with liquid recycle.

15. The method according to claim 13, wherein a part of the acid washing solution is bled off and introduced into an amine absorbent for $CO_2$ capture.

16. The method according to claim 13, wherein make-up water containing carbonic acid is supplied to a washing system from condensed water and where additional acid is added to obtain a required pH.

17. The method according to claim 13, wherein a heat exchanger in an acid water wash loop is used to control water volume and concentration of dissolved compounds in the water.

18. The method according to claim 13, wherein one or more washing steps where the $CO_2$ lean exhaust gas is washed by water are arranged between the absorption zone for absorption of $CO_2$ and an acid wash section.

* * * * *